United States Patent [19]

Matsuura et al.

[11] Patent Number: 4,739,650
[45] Date of Patent: Apr. 26, 1988

[54] GAS FLOW MEASURING APPARATUS

[75] Inventors: Takeo Matsuura, Anjo; Yukio Mori, Nagoya; Toshio Tanahashi, Toyota; Akira Muramatsu, Kariya, all of Japan; Ryo Nagasaka, San Francisco, Calif.; Mikiyasu Kouketsu, Ichinomiya, Japan; Yukio Sawada, Kariya, Japan; Hiroshi Hasegawa, Nagoya, Japan

[73] Assignee: Nippondenso Co., Ltd., Kariya, Japan

[21] Appl. No.: 932,055

[22] Filed: Nov. 18, 1986

[30] Foreign Application Priority Data

Nov. 19, 1985 [JP] Japan .................. 60-259136
Dec. 9, 1985 [JP] Japan .................. 60-276461
Dec. 24, 1985 [JP] Japan .................. 60-296505
Jul. 25, 1986 [JP] Japan .................. 61-176310

[51] Int. Cl.$^4$ .......................... G01M 15/00
[52] U.S. Cl. ..................... 73/118.2; 73/861.74
[58] Field of Search ............ 73/118.2, 861.74, 861.55; 123/494; 137/98

[56] References Cited

U.S. PATENT DOCUMENTS 2,966,133 12/1960 Hube .............. 73/861.75 X
3,539,159 11/1970 Handtmann .
3,589,384 6/1971 Eckert .
3,880,125 4/1975 Kammerer et al. .
3,943,891 3/1976 Kinugawa .
4,368,646 1/1983 Rogg .............. 73/861.55

FOREIGN PATENT DOCUMENTS 59-12865 3/1984 Japan .

Primary Examiner—Jerry W. Myracle
Attorney, Agent, or Firm—Cushman, Darby & Cushman

[57] ABSTRACT

An apparatus for measuring a flow rate of gas comprises a gas passage through which the gas to be measured flows in an axial direction thereof, a movable member linearly movable being disposed in the gas passage in a gas flow direction, a flow pipe providing therein the gas passage, a cross-sectional area of the flow pipe being increased along the gas flow direction in at least over a moving range of the movable member, a rod secured to the movable member to extend from the movable member along the gas flow direction, a bearing for bearing the rod for movement in response to moving of the movable member, the bearing being disposed in the gas passage and secured to the flow pipe, a helical spring for urging the movable member towards a direction opposite to the gas flow direction, a potentiometer for converting an amount of displacement of the rod into an electric signal, an amount of the displacement of the rod corresponding to that of movement of the movable member, a first cylinder closed at one end thereof by the movable member and opened at the other end thereof, the first cylinder extending along the gas flow direction, and a second cylinder disposed in the gas passage and secured to the flow pipe, the second cylinder being closed at one end thereof and opened at the other end thereof, the second cylinder being engaged at the other end thereof with the other end of the first cylinder through a minute clearance therebetween.

44 Claims, 6 Drawing Sheets

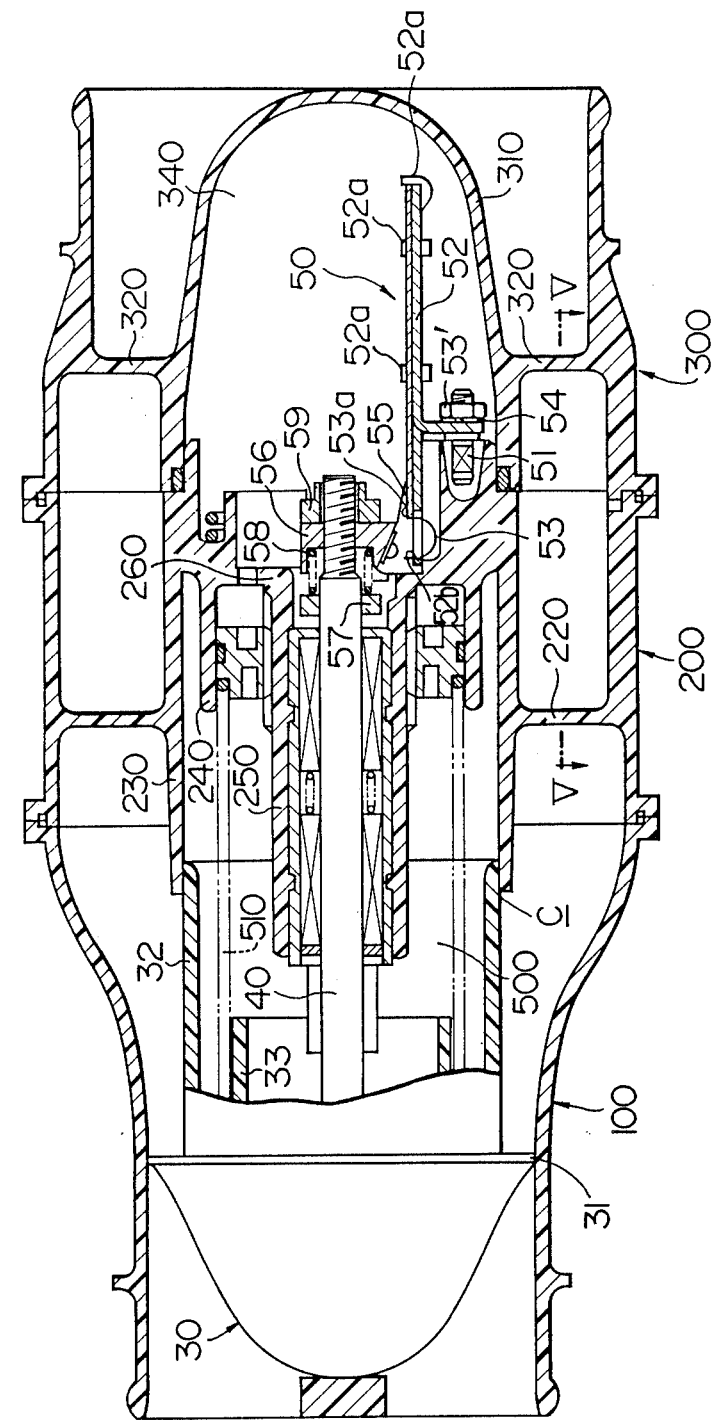

GAS FLOW MEASURING APPARATUS

FIELD OF THE INVENTION AND RELATED ART STATEMENT

The present invention relates to an apparatus for measuring gas flow such as air flowing in a flow passage pipe.

In a conventional vehicle engine system, in order to supply an amount of fuel in correspondence with the flow of air sucked into an engine, there is provided an apparatus for measuring the air flow. Such a measuring apparatus has been recently developed for automotive vehicles as a vane type, a hot-wire type, a Kármán vortex type and so on. Some of these have been put into practical use.

In the vane type air flow measuring apparatus, as shown in, for example, Japanese Examined Patent Publication No. 12865/84, a rectangular vane (resistance plate) which is pivotally mounted so as to traverse a rectangular cross-section of a flow passage is swung by a pressure difference between an upstream and a down stream side of the rectangular vane caused by the air flow, so that the air flow may be measured in accordance with the angular movement of the vane.

However, in the above-described vane type air flow measuring apparatus, when the air flow is increased, an opening degree of the vane is increased so that a projection component of the vane which receives the pressure from the air flow becomes small. The higher the air flow becomes, the lower a force transmitted to the vane from the air flow becomes. Therefore, in a high air flow region, the change in opening degree of the vane with respect to the air flow change, that is, the change of the angular movement of the vane, becomes very small. It is, therefore, difficult to enhance the measurement precision in the high air flow region.

Also, in the above-described structure, a sector chamber projecting from the side portion of the air passage must be provided in order to suppress a vibration of the vane due to a pulsation of the air flow or an excessive angular movement of the vane due to a rapid change of the air flow. A damping plate swingable in the sector chamber is connected to the vane so that an air damping effect caused by the sector chamber and the damping plate therein is applied to the vane. However, in order to obtain a sufficient air damping effect, it is not preferable to make a volume (size) of the sector chamber excessively small. Due to the fact that the sector chamber is adapted to project from the side portion of the air flow passage, the measuring apparatus as a whole becomes large in size. This is disadvantageous in mounting the measuring apparatus on the vehicle; that is, its installation property is inferior.

OBJECT AND SUMMARY OF THE INVENTION

Accordingly, in view of the above-noted problems, an object of the invention is to provide a gas flow measuring apparatus which ensures a satisfactory measuring accuracy from a low gas flow to a high gas flow region and uses a compact arrangement. It is preferable that the gas flow measuring apparatus according to the invention is applied to an automotive vehicle.

According to the present invention, a movable member is moved in a flow direction of gas to be measured in response to flow of the gas. A rod connected to the movable member is moved in response to the movement of the movable member, and the amount of the movement of the shift is translated into an electric signal by a converting means, thereby an electric signal representative of flow of the gas to be measured is output. Also, a vibrating motion of the movable member may be suppressed by an engagement between a first cylinder provided in the movable member and a second cylinder provided in the apparatus through a minute clearance therebetween.

BRIEF DESCRIPTION OF THE DRAWINGS

FIG. 4 is a longitudinal sectional view taken along the line IV—IV of FIG. 1;

FIG. 5 is a fragmentary sectional view taken along the line V—V of FIG. 4;

DETAILED DESCRIPTION OF THE PREFERRED EMBODIMENTS

The present invention will now be described in respect of the embodiments with reference to the accompanying drawings.

Figure 1:
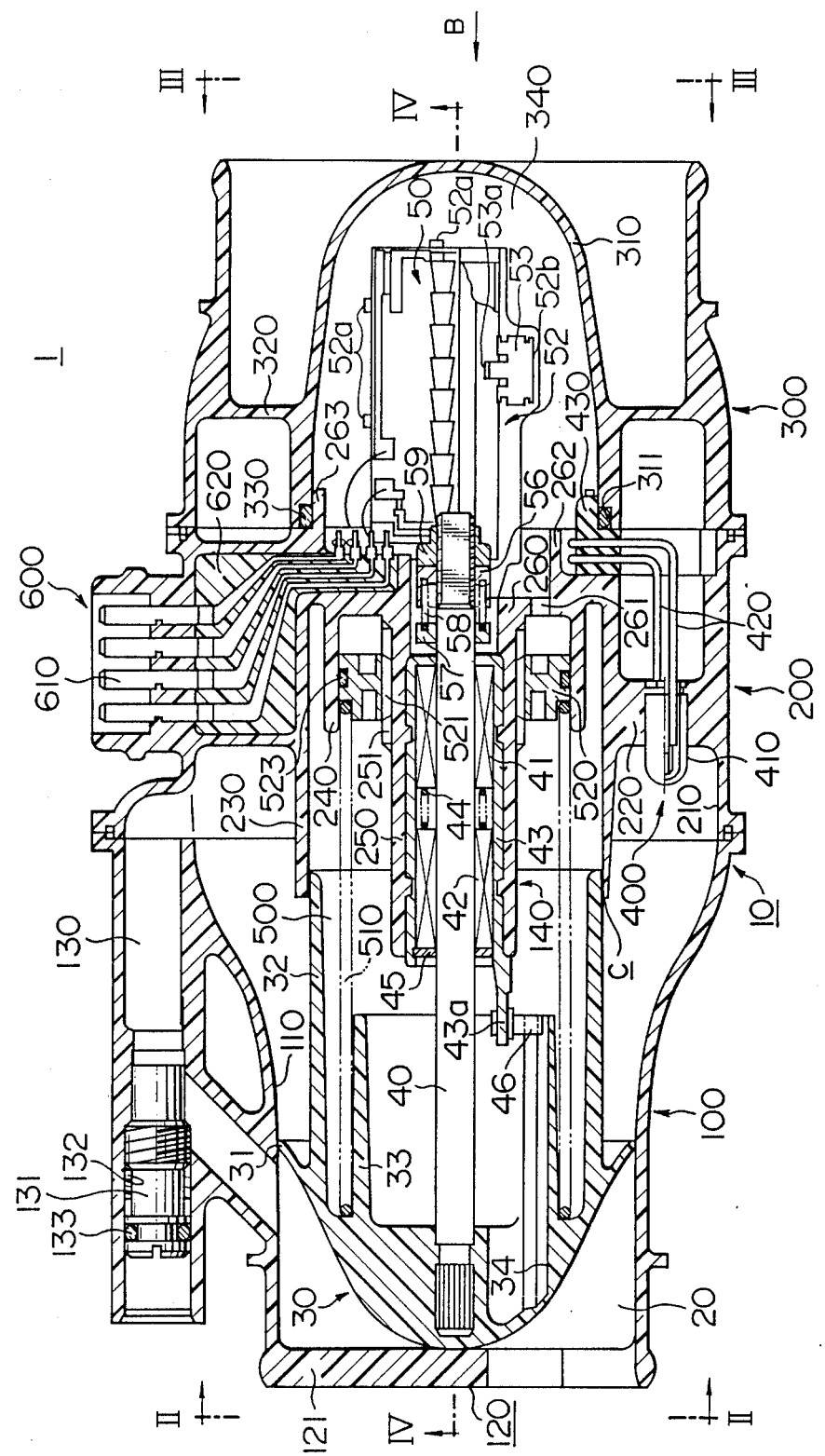
FIG. 1 is a longitudinal sectional view showing a first embodiment of the invention.

In FIG. 1, there is shown an air flow measuring apparatus for measuring flow of air to be sucked into an engine of a vehicle or such as an automotive vehicle, in accordance with an embodiment of the present invention. An air flow pipe 10 constitutes a part of an intake pipe of the engine (not shown). The flow pipe 10 is composed of three housings 100, 200 and 300. Each housing 100, 200 or 300 has a circular inner cross-section, and they are arranged coaxially with each another. An air flow path 20 is formed inside of the air flow pipe 10, through which the air flows in an axial direction of the pipe 10. The respective housings are firmly sealed at each joint portion to prevent the air from leaking out. In the case where the respective housings are made of resin as in the embodiment, the housings are sealed by adhesion-bonding or melting/bonding.

A movable member 30 which is made of resin material is so provided in the air flow path 20 as to be linearly movable along the air flow path. The movable member 30 is convex toward the upstream side with respect to the air flow direction, and the convex surface thereof forms a smooth curved surface symmetric with respect to a central axial line of the flow pipe 10.

The movable member 30 is adapted to move in the most upstream side housing 100. An annular air flow path area (throttle portion area) is defined between a radial outer edge part 31 of the movable member 30 and an inner peripheral wall surface 110 of the housing 100. An inner cross-sectional area of the housing 100 is so gradually increased towards the downstream side within a range of movement of the primary part of the movable member 30 that the annular air flow path area is increased as the movable member 30 is moved towards the downstream side. In addition, the revolution radius of the inner peripheral wall surface 110 is so determined that the amount of movement of the movable member 30 is under a predetermined functional relationship with the increasing or decreasing of the annular air flow path area.

Figure 2:
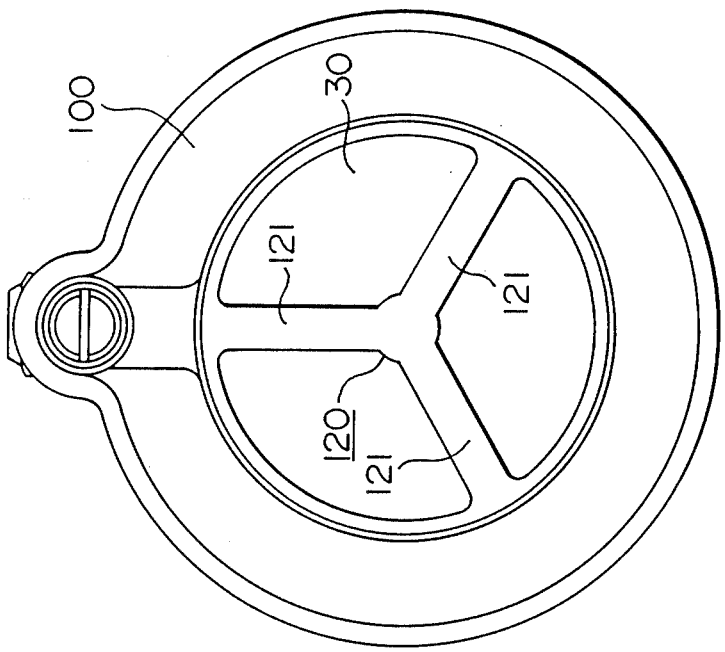

A fully closed position stopper 120 for limiting a most upstream position of the movable member 30, i.e., a position of the movable member 30 where the air flow path area is at minimum (substantially zero) is provided at an upstream inlet end portion of the housing 100. The stopper 120 is composed of three ribs 121 each extending integrally and radially inwardly from the inner peripheral wall surface 110 of the housing 100 (see FIG. 2). When the movable member 30 is positioned at its fully closed position, an apex, set on a central axis of the housing 100, the movable member 30 abuts on the stopper 20. In this case, an elastic member such as rubber or the like may be provided at an abutment portion of the stopper 120 on which the movable member 30 abuts, thus damping a collision shock caused by the abutment therebetween. Incidentally, each respective rib 121 has a streamline shaped cross section in order to prevent turbulence of the air flow.

Further, a bypass passage 130 bypassing the movable member 30 in the flow path 20 is formed in the housing 100. A bypass screw 131 is reciprocatively provided in the bypass passage 130 for regulating a bypass air flow passing therethrough. More specifically, a threaded portion 132 is formed on a part of an inner peripheral wall surface of the bypass passage 130, and the bypass screw 131 is reciprocated by turning clockwise or counterclockwise. An O-ring 133 is interposed between the bypass screw 131 and the inner peripheral wall of the bypass passage 130 in order to seal the threaded portion. By adjusting or regulating the air flow passing through the bypass passage 130 by means of the bypass screw 131, an air/fuel ratio of mixture to be supplied to the engine (not shown) during engine idle may be suitably adjusted.

The above-described movable member 30 is provided integrally with an outer cylinder 32 that projects towards the downstream side along the air flow and has an outside diameter smaller than a diameter of an outer peripheral edge part 31 and with an inner cylinder 33 disposed within the outer cylinder 32. The outer cylinder 32 and the inner cylinder 33 are arranged coaxially with the housing 100. Also, the outer cylinder 32 as well as the inner cylinder 33 are closed at their upstream ends by the movable member 30 and is opened at their downstream end. A rod 40 that extends on the downstream side coaxially with the housing 100 is also fixedly secured to the movable member 30.

Figure 3:
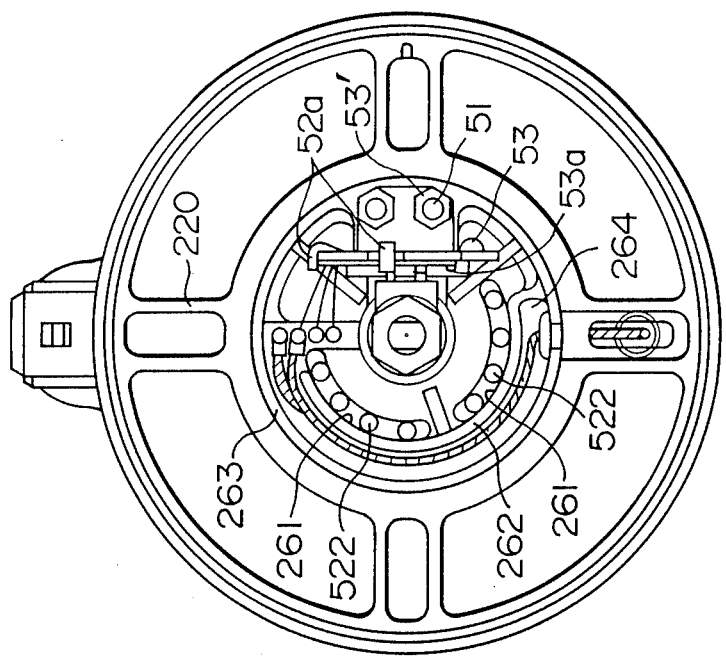
FIGS. 2 and 3 are side elevational views as viewed from the lines II—II and III—III of FIG. 1, respectively.

In the housing 200, four ribs 220 each extending radially inwardly from an inner peripheral wall surface 210 of the housing 200 (see FIG. 3), a large diameter cylindrical portion 230 supported by the ribs 220, an intermediate cylindrical portion 240 within the large diameter cylindrical portion 230, and a small diameter cylindrical portion 250 surrounded by the intermediate cylindrical portion 240 are formed integrally. The large diameter cylindrical portion 230, the intermediate cylindrical portion 240 and the small diameter cylindrical portion 250 are arranged in coaxial relation with the housing 200. An inner diameter of the large diameter cylindrical portion 230 is somewhat larger than an outer diameter of the outer cylinder 32 of the movable member 30. An outer diameter of the intermediate cylindrical portion 240 is somewhat smaller than an inner diameter of the outer cylinder 32 of the movable member 30, and an outer diameter thereof is somewhat larger than an outer diameter of the inner cylinder 33 of the movable member 30. Furthermore, an outer diameter of the small diameter cylindrical portion 250 is somewhat smaller than an inner diameter of the inner cylinder 33 of the movable member 30.

The rod 40 passes on an axis of the small diameter cylindrical portion 250 through a hollow portion thereof. Two sets of bearings 41 and 42 such as ball bearings are held inside of a holder 43 fixed to the inner wall of the small diameter cylindrical portion 250. The rod 40 is axially movably supported by bearing means 140 composed of the bearings 41 and 42, the holder 43 and the small diameter portion 250. In the bearing means 140, the bearings 41 and 42 are disposed in series with each other within the holder 43 and are biased to be moved away from each other by a spring 44 interposed therebetween. The bearings 41 and 42 are held in contact with an end wall of the holder 43 and a ring 45 coupled to the holder 43, respectively.

The outer cylinder 32 is adapted to be telescoped within the large diameter cylindrical portion 230 through a suitable circumferential clearance C, i.e., a minute or fine gap therebetween. The outer cylinder 32 is movable within the large diameter cylindrical portion 230 in response to the movement of the movable member 30 from its full close position to full open position. A downstream portion of the large diameter cylindrical portion 230 is sealed against the air flow path 20 by a cover 310 integrally provided in the housing 300 (to be described later). Accordingly, a space defined by the large diameter cylindrical portion 230 and the outer cylinder 32 is in fluid communication with the air flow path 20 only through the above-described clearance C. Such space constitutes a pneumatic damper chamber 500 that stabilizes or suppresses a fluctuation of the movable member 30 caused by pulsation or rapid change in air flow.

A helical spring 510 is disposed within the pneumatic damper chamber 500 in order to urge the movable member 30 toward the full close position thereof, i.e., in a direction opposite to the air flow. The spring 510 is in contact at one end thereof with a bottom of an annular groove between the outer cylinder 32 and the inner cylinder 33 of the movable member 30, whereas the other end of the spring 510 is in contact with an annular slider 520 disposed between the intermediate cylindrical portion 240 and the small diameter cylindrical portion 250. The spring 510 is guided by the outer peripheral wall surface of the inner cylinder 33. The small diameter cylindrical portion 250 is provided at an outer peripheral wall thereof with a threaded portion 251 which is engaged with a threaded portion 521 formed on the inner wall of the slider 520. By changing the position of the slider 520, a pressure applied to the movable member 30 by the spring 510 may be adjusted. A plurality of holes 522 are provided circumferentially and equiangularly on a downstream side face of the slider 520. Arcuate through-windows 261 are provided, corresponding to the holes 522, in a partition wall 260 formed at respective downstream ends of the large diameter cylindrical portion 230, the intermediate cylindrical portion 240 and the small diameter cylindrical portion 250 (see FIG. 3). The adjustment therefor is to be carried out by inserting a jig or tool (not shown) through the windows 261 into the holes 522, rotating the slider 520 and moving the slider 520 back and forth along the threaded portion 251. An O-ring 523 is disposed between the slider 520 and the intermediate cylindrical portion 240 in order to fix the slider 520.

An intake air temperature sensor 400 is provided at one of the ribs 220 and is housed in a cap made of high heat conductive material such as copper. The cap 410 is integrally molded so as to project its spherical tip end on the upstream side upon molding the housing 200. Lead wires 420 are connected to the sensor 400.

A connector 600 is formed in the housing 200. A plurality of conductive pins 610 of the connector 600 for picking up signals are fixed, by molding, to the rib 220 together with a pin holder 620 so that one end of the conductive pin 610 extends within the connector 600. The other end of the pin 610 is connected to the lead wire 420 of the intake air temperature sensor 400 and is also connected to a sensor (potentiometer 50 to be described later) for detecting an amount of the movement or shift of the movable member 30 and converting it into electric signal. The pin 610 is bent into a L-shape and molded in and fixed to the pin holder 620 made of resin, and the pins 610 held by the pin holder 620 are again molded in and fixed to the rib 220 upon molding the housing 200.

A lead wire holder 430 made of rubber is provided at a suitable portion of the rib 220 in order to prevent the lead wires 420 of the intake air temperature sensor 400 from being displaced within the rib 220. The lead wires 420 are guided by a groove 264 defined between an arcuate projection 262 and an annular projection 263 formed integrally on the downstream side surface of the partition wall 260 upon molding the housing 200. Then, the lead wires 420 are connected to the other ends of the pins 610 (see FIG. 3). The lead wire holder 430 is partly engaged with the projection 263, and the lead wires 420 are led to the groove 264 by the lead wire holder 430.

As best shown in FIG. 4, stud bolt 51 is molded in the partition wall 260 so that one end of the stud bolt 51 projects in the downstream surface portion of the partition wall 260. A metal holder 52 for holding the potentiometer 50 is fixed to the stud bolt 51 through a washer 54 and nut 53'.

The potentiometer 50 is held on the holder 52 so that it is in parallel to the rod 40. The potentiometer 50 is held on the holder 52 by a double-sided adhesive tape provided between the potentiometer 50 and the holder 52. Furthermore, the fixture therebetween is ensured by three projections 52a formed on the holder 52 and U-shaped leaf spring 53, fitted in holes 52b formed at positions corresponding to the projections 52a. With such an arrangement, the potentiometer 50 is pressed by the spring force of the leaf spring 53 toward the respective projections 52a, thereby holding the potentiometer 50 in place in the horizontal direction. Also, the potentiometer 50 is held in the vertical direction by a turnup portion 53a of the leaf spring 53.

A predetermined circuit pattern is formed on a surface of the potentiometer 50. The circuit pattern is electrically connected to the other ends of the pins 610.

A slider 56 having a brush or a contact 55 that is slidingly movable on the circuit pattern of the potentiometer 50 in response to the movement of the shaft 40, i.e., the movement of the movable member 30 is provided at an end of the rod 40 passing through the bearing means 140 (see FIG. 4). The end portion of the rod 40, which projects on the downstream side through the bearing means 140 in the fully closed position of the movable member 30 is provided with a threaded end portion and is bevelled. The slider 56 is fitted through the bevelled portion to the movable member 30. The position of the slider 56 on the rod 40 may be adjusted by a stop plate 57 provided upstream of the slider 56 on the rod 40, a spring 58 interposed between the stop plate 57 and the slider 56, and a nut 59 provided on the downstream side of the rod 40.

Since the brush 55 of the slider 56 is slid on the circuit pattern of the potentiometer 50 to thereby detect the movement of the movable member 30 as described above, it is necessary to prevent the movable member 30 from rotating about its own axis. The rotation of the movable member 30 is prevented as follows. A rivet 46 provided by press-fitting or screw engagement at an end of a projecting portion 43a extending on the upstream side from an end of the holder 43 for holding the bearings 41 and 42 is slidingly moved along a guide groove 34 formed in the inner peripheral wall of the inner cylinder 33 of the movable member 30 in a linear manner in the moving direction.

In the housing 300, there are integrally formed with a cover 310 for housing the potentiometer 50 and other components disposed downstream of the partition wall 260, a plurality of ribs 320 supporting the cover 310. The cover 310 is in a form of a bell-shape and opens its upstream end so that the air flow is not largely disturbed. The upstream side opening portion of the cover 310 has an inner diameter that is substantially equal to an outer diameter of the projection 263 formed on the housing 200. A step 311 is formed inside of the opening end portion of cover 310. The step 311 and the projection 263 define an annular space into which an O-ring 330 is disposed in order to ensure a seal between the projection 263 and the cover 310. The ribs 320 extend radially inwardly from the housing 300 and are gently connected to an outer peripheral surface of the cover 310. The four ribs 320 are provided in correspondence with the ribs 220 of the housing 200, and the downstream end face of the ribs 220 of the housing 200 are in alignment with the upstream end faces of the ribs 320 of the housing 300, thus forming a streamlined shape in cross-section as a whole and suppressing a turbulence of the air flow to a minimum possible level (see FIG. 5).

A potentiometer chamber 340 for housing therein the potentiometer 50 and the like is thus defined by the cover 310, in which the end of the rod 40 having the brush 55 slidable on the circuit pattern of the potentiometer 50 is moved in response to the movement of the movable member 30 on the central axial line. Projected into the potentiometer 340 are the other ends of the pins 610, i.e., the ends to be electrically connected to the lead wires 420 of the intake air temperature sensor 400 and the potentiometer 50.

A projection 321 is provided on one of the ribs 320 of the housing 300 and also a groove 221 for receiving the projection 321 is formed on one of the ribs 220 of the housing 200 in order to enhance the assembling precision in a rotational direction between the housing 200 and the housing 300 as shown in FIG. 5.

In the thus constructed air flow measuring apparatus, when the air flows at a predetermined flow rate Q through the air flow path 20, a pressure difference is generated between the upstream and downstream sides of the movable member 30. The movable member 30 is linearly moved towards the downstream side from the fully closing position limited by the stopper 120. As a result, the air flow path area between the outer edge portion 31 of the movable member 30 and the inner peripheral wall 110 of the housing 100 is increased. The movable member 30 is moved to a position where the air flow path area corresponds to the air flow rate Q, that is, the balancing position between the pressure applying to the upstream side surface of the movable member 30 and the spring force of the spring 510. In response to the movement of the movable member 30, the rod 40 coupled to the movable member 30 is moved by the amount of the movement of the movable member 30 towards the downstream side on the central axial line. The brush 55 of the slider 56 provided at the downstream end of the rod 40 is moved by this displacement x on the circuit pattern of the potentiometer 50. The displacement x is converted into an electric signal by the potentiometer 50 and is outputted to the outside via the pins 610. The air flow rate Q and the air flow path are kept under a predetermined functional relationship. The inner diameter of the housing 100, i.e., the revolutional radius thereof is adjusted so as to establish such predetermined functional relationship between the air flow path area and the displacement x of the movable member 30, i.e., the amount of movement of the movable member 30. Accordingly, the electric signal converted by the potentiometer 50 may represent the air flow rate Q.

In the apparatus, since the communication between the inside and the outside of the pneumatic damper chamber 500 is performed only through the clearance C between the outer cylinder 32 of the movable member 30 and the large diameter cylindrical portion 230 of the housing 200, the vibration of the movable member 30 due to the pulsation of the air flow is supprressed, and the positional change of the movable member 30 is also stabilized against the stepwise change of the air flow. Thus, undesirable actions such as remarkable overshoot of the movable member 30 may be suppressed.

With such an arrangement, the movement of the movable member 30 is linear and in parallel to the air flow within the air flow path 20. Therefore, even if the flow rate is changed, the pressure receiving area of the movable member 30 is kept unchanged, so that it is very easy to make the movement of the movable member 30, i.e., the change of the displacement of the rod 40 uniform from the low flow rate region to the high flow rate region. Thus, it is possible to obtain a constant measuring accuracy irrespective of the change of the flow rate.

Also, within the air flow pipe 10 disposed are the pneumatic damper mechanism for suppressing the vibration of the movable member 30 due to the pulsation of the air flow and the remarkable overshoot or the like of the movable member 30 upon abrupt change in air flow rate and the potentiometer 50 for converting the movement of the rod 40 coupled to the movable member 30 into the electric signal. Accordingly, the apparatus according to the present invention is compact in comparison with conventional vane type measuring apparatus. The apparatus of the invention as a whole may be made small in size, and hence, its mounting property for motor vehicles may by enhanced. Also, since the potentiometer 50 is disposed within the air flow path 20 for picking up the electric signal representative of the air flow, the seal between the air flow path 20 and the outside may readily be ensured.

Also, in the above-described arrangement, the interior of the respective housings 100, 200 and 300 (in particular of the housing 100), the movable member 30, the outer cylinder 32 and the large diameter cylindrical portion 230 for constituting the pneumatic damper chamber 500 are in the form of circular shapes in cross-section. Therefore, is it possible to obtain a satisfactory dimensional precision for these components at a molding technique in comparison with components having rectangular shapes. This makes it unnecessary to perform additional machine works after the molding operation. Also, this makes it possible to reduce the number of the manufacturing steps.

In the foregoing arrangement, since the assemblies of the ribs 220 and 320 of the housings 200 and 300 are streamlined, turbulences of the air flow caused by the ribs 220 and 320 may be well suppressed. Also, since the apparatus is so constructed that the potentiometer 50 is received in the potentiometer chamber 340 by the cover 310, thereby preventing the air flow from coming into direct contact with the potentiometer 50, foreign matters or moisture contained in the air may be prevented from adhering or sticking to the potentiometer 50. In particular, in the case where the apparatus is mounted on the engine as in the above-described embodiment, fuel, oil, carbon or the like derived from the engine may be prevented from sticking to the potentiometer 50, thereby keeping the measuring accuracy and the durability unchanged. It is, therefore, possible to keep the initial property of the apparatus in a sufficient state for a long period of time.

In the foregoing arrangement, the outer cylinder 32 of the movable member 30 is engaged with the inside of the large diameter cylindrical portion 230 through the minute clearance C, but it is possible to engage the outer cylinder 32 with the outside of the large diameter cylindrical portion 230 through a like minute clearance. However, it is preferable that the outer cylinder 32 is to be engaged with the inside of the large diameter cylindrical portion 230. The reason for this is that a sufficient amount of air is introduced through the minute clearance into the pneumatic damper chamber 500 by utilizing the vacuum pressure produced by the movable member 30. More specifically, if the large diameter cylindrical portion 230 is telescoped into the inside of the outer cylinder 32 via the minute clearance therebetween, an introduction part of the vacuum produced by the movement of the movable member 30 toward the pneumatic damper chamber 500 is located at the downstream end of the outer cylinder 32 and is shifted in response to the movement of the movable member 30 to the downstream side.

The downstream of the movable member 30 is kept as a whole under the vacuum condition at a low air flow rate since the air flow path area defined between the outer edge 31 of the movable member 30 and the inner peripheral wall 110 of the housing 100 is small. However, at a high air flow rate, since the air flow path area is increased, the pressure in the region downstream of the movable member 30 is returned back to substantially the same pressure as that of the region upstream of the movable member 30. Accordingly, when the end of the outer cylinder 32 is moved to the region where the pressure is returned back to the upstream pressure, the pressure of the upstream region is introduced into pneumatic damper chamber 500 through the clearance C, so that the pressure within the pnuematic damper chamber 500 is balanced with the upstream pressure of the movable member 30. Thus, even if the air flow rate is increased over that level, the movable member 30 is unlikely to move from that position. Therefore, there is a fear that it would be impossible to measure the air flow under the high air flow condition.

However, in the foregoing embodiment, the pressure is introduced into the pneumatic damper chamber 500 at the upstream end of the large diameter cylindrical portion 230 of the housing 200 so that the movable member 30 is moved to the downstream side as the air flow is increased. Namely, since the edge 31 of the movable member 30 is close to the upstream end of the large diameter cylindrical portion 230, the upstream end of the large diameter cylindrical portion 230 is always located in the region of vacuum pressure produced by the movable member 30. Accordingly, the vacuum pressure caused by the movable member 30 is always, sufficiently imparted to the pneumatic damper chamber 500 under a stable condition. It is therefore, possible to obtain a satisfactory movement property of the movable member 30 in response to the flow rate change over the range from the low air flow to the high air flow.

In the foregoing arrangement, it is possible to adjust or regulate the spring pressure of the spring 510 by varying the position of the slider 520 while moving the slider 520 along the threaded portion 251 formed on the outer peripheral wall of the small diameter cylindrical portion 250. Accordingly, under a preassembling condition where only housing 300 is not provided in the arrangement, the position of the slider 520 is adjusted with the tool or jig through the windows 261, thereby readily setting the spring force of the spring 510 at a desired level. Furthermore, since the adjustment of the spring force is carried out upon substantially the completion of the mounting of the measuring apparatus, an acceptable range of the dimensional precision of the respective components or the assembling precision thereof may be widened.

In the foregoing arrangement, since the cap 410 receiving therein the intake air temperature sensor 400 is provided within the rib 220, the cap 410 is located downstream of the movable member 30. Accordingly, the movement of the movable member 30 is out of the influence of the cap 410.

Figure 6:
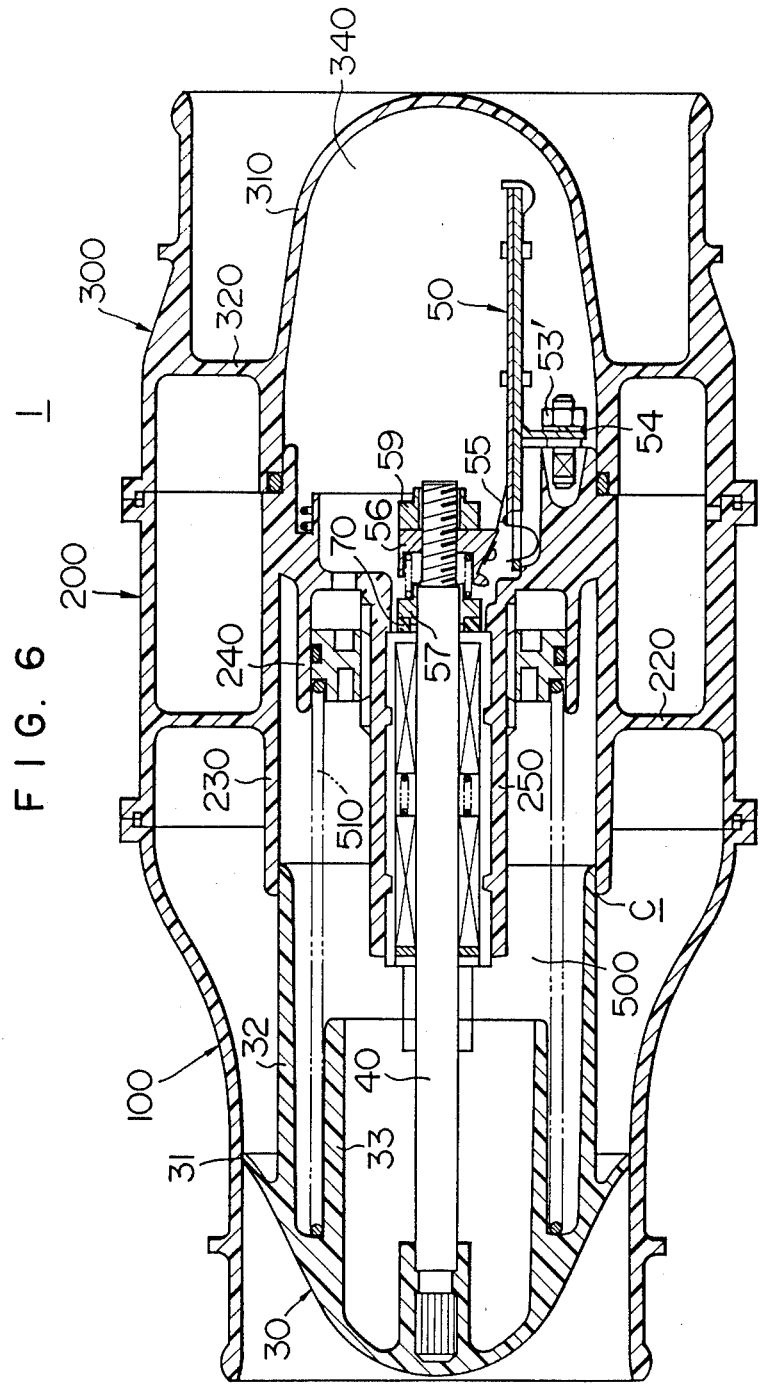
FIG. 6 is a longitudinal sectional view showing another embodiment of the invention.

Another embodiment of the invention will now be described with reference to FIG. 6 in which the same reference characters are used to the like components or members in the first embodiment.

In the second embodiment, a stopper 70 for limiting the full closed position of the movable member 30 is fitted in a stop plate 57 fixed to a portion of the rod 40 downstream of the bearing means 140. The stopper 70 is made of elastic material or elastmer. The rod 40 is stopped in contact with a downstream end face of the holder 43 of the bearing means 140.

With such an arrangement, the air flow to collide with the upstream surface of the movable member 30 may be made gently, thereby stabilizing the movement of the movable member 30 and reducing the pressure loss of the air flow.

Incidentally, it is possible to fixedly secure the stopper 70 to a portion of the rod 40 upstream of the stop plate 57 rather than to fittingly engage the stopper 70 with the stop plate 57. Also, if the stopper 70 is displaceable relative to the rod 40, it is possible to carry out a fine adjustment of the full closed position of the movable member 30.

Figure 7:
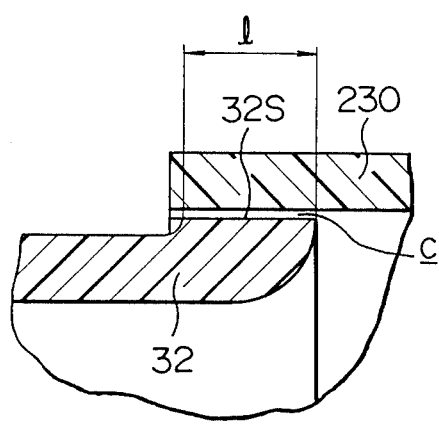
FIG. 7 is an enlarged, fragmentary sectional view showing a clearance in accordance with still another embodiment.

Still another embodiment of the invention will now be described with reference to FIG. 7 which shows a clearance between the outer cylinder 32 of the movable member 30 and the large diameter cylindrical portion 230 of the housing 200. In this embodiment, a predetermined downstream region of the outer peripheral wall surface of the outer cylinder 32, facing the inner peripheral wall surface of the large diameter portion 230 under the fully closing position of the movable member 30, that is, facing the outer cylinder 32 irrespective of the movement of the movable member 30 is referred to as a "clearance surface" 32S which defines the clearance C between the outer periphery of the outer cylinder 32 and the inner periphery of the large diameter cylindrical portion 230. More specifically, the outer peripheral surface (predetermined length l), on the downstream region of the outer cylinder 32, referred to as the clearance surface 32S, has a larger diameter than that of the outer peripheral surface of the outer cylinder 32 other than the clearance surface 32S. Also, the clearance surface 32S is formed at much higher dimensional precision than the other outer peripheral surface of the outer cylinder 32.

With such a structure, the requirement of the dimensional precisions of the clearance C between the outer cylinder 32 and the large diameter cylindrical portion 230, and of the outer cylinder 32 that determine the damping property of the measuring apparatus may be limited to a restricted region. Thus, it is very easy to obtain the stable damping property. Furthermore, even if foreign matters entrained in the air would enter between the outer cylinder 32 and the large diameter cylindrical portion 230, the entrained foreign matters may readily be removed because the length of the clearance surface 32S is much shorter than the overall size of the outer cylinder 32. There is little fear that the foreign matter entrainment would make the movement of the movable member 30 difficult. Incidentally, the clearance surface 32S may be made on the large diameter cylindrical portion 230.

Figure 8:
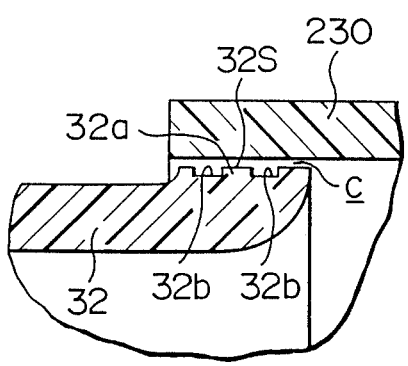
FIG. 8 is an enlarged, fragmentary sectional view showing a clearance in accordance with yet another embodiment.

FIG. 8 shows still another embodiment of the invention in which two annular grooves 32b are circumferentially formed on a periphery of a projecting land 32a formed at an end portion of an outer cylinder 32 facing an inner peripheral wall surface of a large diameter cylindrical portion 230.

By the grooves 32b there is occurred an air communication in the clearance C between a clearance surface 32S of the projecting land 32a and the inner circumferential wall surface of the large diameter cylindrical portion 230 as the movable member 30 is moved. In this case, the air flowing through the clearance C is expanded or compressed by the convex and concave configuration formed by the grooves 32b. Then, the fluid resistance due to the expansion and compression of the flowing air causes the air to flow gently, so that the damping effect for the movable member 30 is enhanced.

The above-described fluid resistance is caused by a labyrinth seal effect such that the convex and concave configuration formed by the grooves 32b of the projecting land 32a repeatedly compresses and expands the air. In this case, with respect to the energy of the air, the pressure energy and the velocity energy are replaced by each other, whereupon the energy loss is caused and it serves as the fluid resistance.

Also, in the above-described embodiment, the projecting land 32a is formed at the downstream end portion of the outer peripheral wall of the outer cylinder 32 to define the clearance 32S, but the clearance surface 32S may be formed on the large diameter cylindrical portion 230. Namely, the projecting land is formed, close to the outer peripheral surface of the outer cylinder 32, on an upstream portion of the inner peripheral wall of the large diameter cylindrical portion 230 to form the clearance surface 32S.

FIGS. 9 to 14 show other embodiments of the mechanisms for preventing the movable member 30 from rotating.

Figure 9:
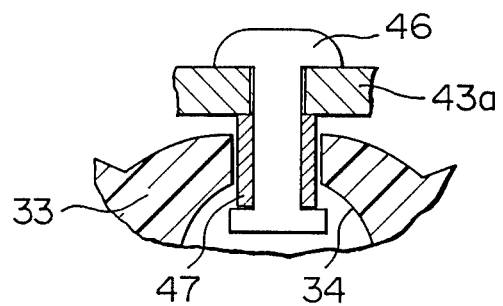
FIGS. 9 to 14 are enlarged, fragmentary sectional views showing rotation preventing means for the movable members in accordance with other embodiments.

In the embodiment shown in FIG. 9, in order to suppress the friction between the contact portions of a rivet 46 and a guide groove 34, a cylindrical and low frictional bearing 47 is rotatably fitted on the rivet 46. With such a structure, the friction between the rivet 46 and the guide groove 34 may be reduced during the movement of the movable member 30. It is possible to apply a low friction coating such as a teflon coating onto the surface of the rivet 46 instead of the provision of the bearing 47.

Figure 10:
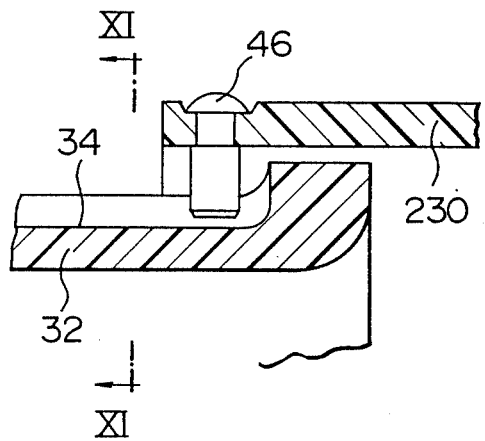
Figure 11:
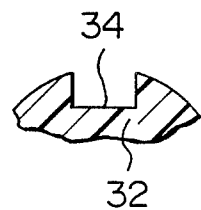

In the embodiment shown in FIGS. 10 and 11, a rivet 46 is provided at the upstream open end of the large diameter cylindrical portion 230, and a linear guide groove 34 is formed along the moving direction of the movable member 30 in an outer peripheral wall surface of the outer cylinder 32. The tip end of the rivet 46 is engaged with the guide groove 34, thereby preventing the movable member 30 from rotating. In order to obtain the like effect, the rivet 46 may be provided in the outer cylinder 32 and the guide groove 34 may be formed in the inner peripheral wall surface of the large diameter cylindrical portion 230. Also, the guide groove may be formed in the rod 40, and a pin or the like that is engaged with the guide groove may be formed in the holder 43.

Figure 12:
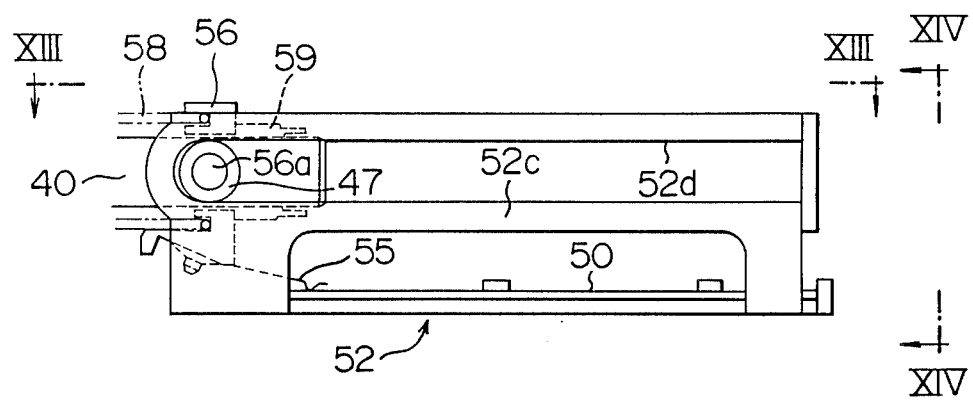
Figure 13:
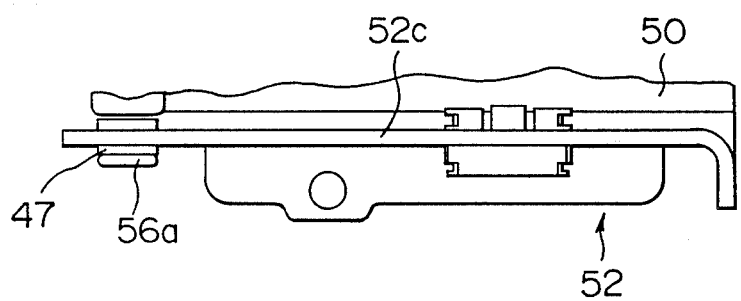
Figure 14:
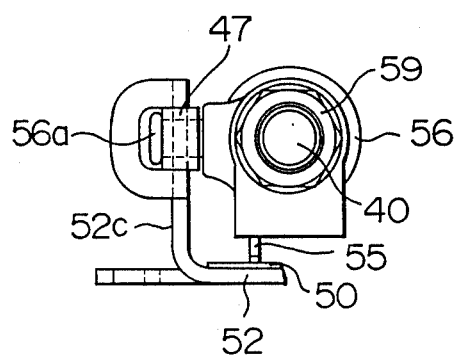

In the embodiment shown in FIGS. 12 to 14, one end portion 52c of a potentiometer holder 52 is bent at a right angle with respect to a portion thereof for holding the potentiometer 50 in place, and a linear guide groove 52d extending parallel to a moving direction of the rod 40 is formed in the bent portion 52c of the holder 52. A pin 56a that is movably engaged with the guide groove 52d is secured to a slider 56 fixed to the rod 40. A bearing 47 as in that shown in FIG. 9 is provided around the pin 56a. Accordingly, the pin 56a is guided by the guide groove 52d, thereby preventing the rotation of the rod 40.

In order to facilitate the engagement between the pin 56a and the guide groove 52d, the downstream end of the bent portion 52c is further bent in a direction opposite to the rod 40. The pin 56a may be engaged from the downstream, open end of the bent portion 52c into the guide groove 52d upon the assembling.

In the foregoing embodiments, the potentiometer 50 is used for converting the movement of the rod 40 into an electric signal, but any other sensors that may convert the movement of the rod 40 into an electric signal may be used. For example, a differential transducer, an optical non-contact type positional sensor or the like may be used.

In the case where the apparatus in accordance with the above-described embodiments is applied to the measurement of a flow of air to be sucked into an automotive engine, it is preferable that the apparatus be arranged within an engine room in the horizontal direction with respect to the road or ground and be oblique at an angle of about 45° with respect to the running direction of the vehicle.

Although the foregoing embodiments are directed to the measurement of the air flow in the motor vehicle engine, it is apparent that the measuring apparatus in accordance with the present invention may be applied to the measurement of any other gas flow.

What is claimed is:

1. An apparatus for measuring a flow rate of gas, comprising:
    a gas passage through which the gas to be measured flows in an axial direction thereof;
    a movable member disposed in said gas passage, said movable member being linearly movable in a flow direction of said gas;
    a flow pipe providing therein said gas passage, a cross-sectional area of said flow pipe being increased along the gas flow direction in at least over a moving range of said movable member;
    a rod secured to said movable member, said rod extending from said movable member along the gas flow direction;
    means for bearing said rod for movement in response to moving of said movable member, said bearing means being disposed in said gas passage and secured to said flow pipe;
    biasing means for urging said movable member towards a direction opposite to the gas flow direction;
    means for converting an amount of displacement of said rod into an electric signal, an amount of said displacement of said rod corresponding to that of movement of said movable member;
    a first cylinder closed at one end thereof by said movable member and opened at the other end thereof, said first cylinder extending along the gas flow direction; and
    a second cylinder disposed in said gas passage and secured to said flow pipe, said second cylinder being closed at one end thereof and opened at the other end thereof, said second cylinder being engaged at said the other end thereof with said other end of said first cylinder through a minute clearance therebetween.

2. An apparatus according to claim 1, wherein said first cylinder is telescoped into an inside of said second cylinder.

3. An apparatus according to claim 1, wherein an axis of said rod, an axis of said first cylinder and an axis of said second cylinder coincide with an axis of said flow pipe.

4. An apparatus according to claim 1, wherein said converting means is disposed in said flow pipe.

5. An apparatus according to claim 4, wherein said converting means is provided along the moving direction of said rod, and wherein said converting means comprises a potentiometer board on which an electric resistance circuit pattern is provided along the moving direction of said rod and an electric contact slidable on said electric resistance circuit pattern, whereby the amount of the displacement of said rod is outputted as an electric voltage signal in response to a value of resistance corresponding to a contacting position of said electric contact on said electric resistance circuit pattern.

6. An apparatus according to claim 5, wherein said apparatus further comprises means for preventing a rotational motion of said movable member.

7. An apparatus according to claim 6, wherein said rotation preventing means comprises a linear groove formed along the moving direction of said movable member, said linear groove being formed in one of said movable member and a component that moves together with the movable member, and a projection engaged with said linear groove and formed on a member fixed to said flow pipe.

8. An apparatus according to claim 6, wherein said rotation preventing means comprises a projection formed on one of said movable member and a component that moves together with said movable member, and a linear groove formed along the moving direction of said movable member, said linear groove being formed in a member fixed to said flow pipe.

9. An apparatus according to claim 4, wherein said apparatus further comprises supporting means for supporting said bearing means and said second cylinder, said supporting means extending from an inner peripheral wall surface of said flow pipe into said gas passage and incorporating therein electric wires for picking up the electric signal from said converting means.

10. An apparatus according to claim 1, wherein said apparatus further comprises supporting means for supporting said bearing means, said supporting means extending from an inner peripheral surface of said flow pipe into said gas passage.

11. An apparatus according to claim 1, wherein said biasing means comprises a helical spring.

12. An apparatus according to claim 11, wherein said helical spring is interposed within a space defined between said first cylinder and said second cylinder.

13. An apparatus according to claim 12, wherein said apparatus further comprises an adjusting means for adjusting a biasing force of said helical spring, said adjusting means being disposed in said second cylinder for reciprocating along a moving direction of said movable member, said adjusting means being held in contact with one end of said helical spring.

14. An apparatus according to claim 13, wherein said apparatus further comprises at least one hole formed in the one end portion of said second cylinder, through which an adjusting tool or jig is inserted to engage said adjusting means, and a cover for covering said hole provided at said one end of said second cylinder.

15. An apparatus according to claim 14, wherein an axis of said rod, an axis of said first cylinder and an axis of said second cylinder coincide with an axis of said flow pipe, and wherein a distal end of said rod extends into a space defined between said other end of said second cylinder and said cover, in which said converting means are disposed.

16. An apparatus according to claim 15, wherein said converting means is provided along the moving direction of said rod, and wherein said converting means comprises a potentiometer board on which an electric resistance circuit pattern is provided along the moving direction of said rod and an electric contact slidable on said electric resistance circuit pattern, whereby the amount of the displacement of said rod is outputted as an electric voltage signal in response to a value of resistance corresponding to a contacting position of said electric contact on said electric resistance circuit pattern.

17. An apparatus according to claim 15, wherein said apparatus further comprises supporting means for supporting said bearing means and said second cylinder, said supporting means extending from an inner peripheral wall surface of said flow pipe into said gas passage and incorporating therein electric wires for picking up the electric signal from said converting means.

18. An apparatus according to claim 1, wherein said first cylinder is disposed downstream of said movable member.

19. An apparatus according to claim 18, wherein said apparatus further comprises supporting means for supporting said bearing means and said second cylinder, said supporting means extending from an inner peripheral wall surface of a portion of said flow pipe disposed downstream of said movable member into said gas passage.

20. An apparatus according to claim 19, wherein said apparatus further comprises a sensor for detecting a temperature of the gas to be measured, said sensor being provided on said supporting means.

21. An apparatus according to claim 20, wherein said sensor is housed in a metal container integrally formed with said supporting means.

22. An apparatus according to claim 20, wherein said apparatus further comprises electric wires for picking up the detected signal from said sensor, and wherein said electric wires are incorporated within said supporting means.

23. An apparatus according to claim 1, wherein said apparatus further comprises a full close stopper means for limiting the movement of the movable member caused by said biasing means when said movable member substantially closes said gas passage and for stopping said movable member at its fully closed position.

24. An apparatus according to claim 23, wherein said first cylinder is disposed downstream of said movable member, said second cylinder is engaged with a downstream portion of said first cylinder, and said full close stopper means is disposed upstream of said movable member and fixed to said flow pipe.

25. An apparatus according to claim 23, wherein said full close stopper means is provided on said rod, and wherein said full close stopper means may come into abutment with a part of said bearing means for limiting the movement of said movable member.

26. An apparatus according to claim 23, wherein said full close stopper means is provided with shock absorbing means for absorbing a collision shock produced when said movable member is abruptly moved toward the fully closed position.

27. An apparatus according to claim 26, wherein said shock absorbing means comprises an elastic member.

28. An apparatus according to claim 26, wherein said full close stopper means is movable along said rod.

29. An apparatus according to claim 1, wherein said apparatus further comprises an annular land being formed on a peripheral wall surface of an open end portion of one of said first cylinder and said second cylinder, facing the other cylinder irrespective of the movement of said movable member and circumferentially projecting close to a peripheral wall surface of the other cylinder, said annular land defining a clearance between said first cylinder and said second cylinder.

30. An apparatus according to claim 29, wherein at least one annular groove is formed along said annular land.

31. An apparatus according to claim 1, wherein at least one annular groove is circumferentially formed on a peripheral wall surface of one of said first cylinder and said second cylinder facing the other cylinder.

32. An apparatus according to claim 1, wherein said apparatus further comprises means for preventing a rotational motion of said movable member.

33. An apparatus according to claim 32, wherein said rotation preventing means comprises a linear groove formed along the moving direction of said movable member, said linear groove being formed in one of said movable member and a component that moves together with the movable member, and a projection engaged with said linear groove and formed on a member fixed to said flow pipe.

34. An apparatus according to claim 32, wherein said rotation preventing means comprises a projection formed on one of said movable member and a component that moves together with said movable member, and a linear groove formed along the moving direction of said movable member, said linear groove being formed in a member fixed to said flow pipe.

35. An apparatus according to claim 1, wherein said flow pipe has an interior in a form of a body of revolution defining said gas passage and said movable member is also in a form of a body of revolution, and wherein the relationship between the revolutional radii of said interior of said flow pipe and said movable member along the gas flow direction is determined on the basis of a predetermined functional relationship.

36. An apparatus for measuring a flow rate of gas, comprising:
   a gas passage through which the gas to be measured flows in an axial direction thereof;
   a movable member disposed in said gas passage, said movable member being linearly movable in a flow direction of said gas, and said movable member being provided with a first cylinder closed at one end thereof by said movable member and opened at the other end thereof, and extending in the gas flow direction;
   a flow pipe providing therein said gas passage, a cross-sectional area of said flow pipe being increased along the gas flow direction in at least over a moving range of said movable member;
   a holder secured to said flow pipe for holding said movable member to be movable, said holder being provided with a second cylinder secured at one end thereof to said holder and closed at said one end thereof and opened at the other end thereof, said second cylinder being telescoped with one of outer and inner sides of said first cylinder through a minute clearance;
   a helical spring interposed between said movable member and said holder for urging said movable member towards a direction opposite to the flow direction of said gas;
   means for detecting an amount of a displacement of said movable member; and
   an adjusting member for adjusting a biasing force of said helical spring, said adjusting member being held in contact with one end of said helical spring, said adjusting member being movable in the gas flow direction, said adjusting member being provided on one of said movable member and said holder, and said adjusting member and said helical spring being interposed in a space defined between said first cylinder and said second cylinder.

37. An apparatus according to claim 35, wherein said first cylinder is disposed downstream of said movable member, and said second cylinder is disposed upstream of said holder.

38. An apparatus according to claim 35, wherein said second cylinder is provided at said one end with holes, wherein said adjusting member is provided within said second cylinder, thereby enabling the adjustment of the position of said adjusting member through said holes, and wherein said second cylinder is provided at said one end with a cover for covering said holes.

39. An apparatus for measuring a flow rate of gas, comprising:
   a gas passage through which the gas to be measured flows in an axial direction thereof;
   a movable member disposed in said gas passage, said movable member being linearly movable in a flow direction of said gas;
   a flow pipe providing therein said gas passage, a cross-sectional area of said flow pipe being increased along the gas flow direction in at least over a moving range of said movable member;
   a holder secured to said flow pipe for holding said movable member to be movable;
   means for urging said movable member towards a direction opposite to the gas flow direction;
   means for converting an amount of displacement of said movable member into an electric signal;
   a first cylinder closed at one end thereof by said movable member and opened at the other end, said first cylinder extending in the gas flow direction;
   a second cylinder secured at one end thereof to said holder, said second cylinder being closed at said one end and opened at the other end, said second cylinder being engaged at the other end thereof with one of outer and inner sides of said first cylinder at the other end thereof through a minute clearance; and
   an annular land formed on a peripheral wall surface of an open end portion of one of said first cylinder and said second cylinder, facing the other cylinder irrespective of the movement of said movable member and circumferentially projecting close to a peripheral wall surface of the other cylinder, said annular land defining a clearance between said first cylinder and said second cylinder.

40. An apparatus according to claim 39, wherein at least one annular groove is formed along said annular land.

41. An apparatus for measuring a flow rate of gas, comprising:
   a gas passage through which the gas to be measured flows in an axial direction thereof;
   a movable member disposed in said gas passage, said movable member being linearly movable in a flow direction of said gas;
   a flow pipe providing therein said gas passage, a cross-sectional area of said flow pipe being increased along the gas flow direction in at least over a moving range of said movable member;
   a holder secured to said flow pipe for holding said movable member to be movable;
   biasing means for urging said movable member towards a direction opposite to the gas flow direction;
   means for converting an amount of displacement of said movable member into an electric signal;
   a first cylinder closed at one end thereof by said movable member and opened at a second end, said first cylinder extending along the gas flow direction;
   a second cylinder secured at one end thereof to said holder, said second cylinder being closed at said one end and opened at the other end, said second cylinder being engaged at the other end thereof with one of outer and inner sides of said first cylinder at the other end thereof through a minute clearance; and annular grooves circumferentially formed on a peripheral wall surface of one of said first cylinder and second cylinder, facing the other cylinder.

42. An apparatus for measuring a flow rate of gas, comprising:
- a gas passage through which the gas to be measured flows in an axial direction thereof;
- a movable member disposed in said gas passage, said movable member being linearly movable in a flow direction of said gas;
- a flow pipe providing therein said gas passage, a cross-sectional area of said flow pipe being increased along the gas flow direction in at least over a moving range of said movable member;
- a holder secured to said flow pipe for holding said movable member to be movable;
- biasing means for urging said movable member towards a direction opposite to the gas flow direction;
- means for detecting an amount of displacement of said movable member; and
- means for preventing a rotational motion of said movable member.

43. An apparatus according to claim 42, wherein said rotation preventing means comprises a linear groove formed along the moving direction of said movable member, said linear groove being formed in one of said movable member and a component that moves together with the movable member, a projection being engaged with said linear groove and formed on a member fixed to said flow pipe.

44. An apparatus according to claim 42, wherein said rotation preventing means comprises a projection formed on one of said movable member and a component that moves together with said movable member, a linear groove being formed along the moving direction of said movable member, said linear groove being formed in a member fixed to said flow pipe.

* * * * *